United States Patent
Boutros et al.

(10) Patent No.: US 11,012,357 B2
(45) Date of Patent: May 18, 2021

(54) USING A ROUTE SERVER TO DISTRIBUTE GROUP ADDRESS ASSOCIATIONS

(71) Applicant: VMware, Inc., Palo Alto, CA (US)

(72) Inventors: Sami Boutros, Union City, CA (US); Ganesan Chandrashekhar, Union City, CA (US); Jayant Jain, Cupertino, CA (US); Lakshman Krishnamoorthy, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/445,971

(22) Filed: Jun. 19, 2019

(65) Prior Publication Data

US 2020/0403915 A1     Dec. 24, 2020

(51) Int. Cl.
| | |
|---|---|
| H04L 12/28 | (2006.01) |
| H04L 12/741 | (2013.01) |
| H04L 29/08 | (2006.01) |
| H04L 29/12 | (2006.01) |
| H04L 12/66 | (2006.01) |
| H04J 1/16 | (2006.01) |

(52) U.S. Cl.
CPC ............ H04L 45/745 (2013.01); H04L 12/66 (2013.01); H04L 61/2007 (2013.01); H04L 61/2069 (2013.01); H04L 67/10 (2013.01)

(58) Field of Classification Search
CPC ............... H04L 12/4633; H04L 45/745; H04L 61/2069; G06F 9/45533; G06F 9/45558

USPC .......................................... 370/252, 401, 386
See application file for complete search history.

(56) References Cited

U.S. PATENT DOCUMENTS

| | | | |
|---|---|---|---|
| 10,069,646 B2* | 9/2018 | Shen .................... | H04L 12/4633 |
| 2014/0068703 A1* | 3/2014 | Balus ................... | H04L 41/0893 726/1 |
| 2015/0341466 A1* | 11/2015 | Sah ...................... | H04L 67/1002 707/770 |
| 2016/0191363 A1* | 6/2016 | Haraszti .............. | H04L 67/2842 709/223 |
| 2019/0158419 A1* | 5/2019 | Certain .............. | G06Q 30/0284 |
| 2020/0177629 A1* | 6/2020 | Hooda .................. | H04L 47/746 |

* cited by examiner

*Primary Examiner* — John Pezzlo
(74) *Attorney, Agent, or Firm* — Patterson + Sheridan, LLP

(57) ABSTRACT

Embodiments described herein involve learning and distributing associations between groups and addresses. Embodiments include receiving, by a first route server associated with a first central control plane (CCP) of a first data center, a definition of a first group. Embodiments include learning, by the first route server, a first association between the first group and one or more addresses based on the definition of the first group. Embodiments include transmitting, by the first route server, the first association to a second route server in a second CCP of a second data center. Embodiments include receiving, by the first route server, from the second route server, a second association between the first group and one or more additional addresses. Embodiments include storing, by the first route server, the first association and the second association in a table and programming, by the first central control plane, the hypervisor based on the table.

20 Claims, 4 Drawing Sheets

| GROUP ID | IP ADDRESS | DOMAIN |
| --- | --- | --- |
| OS1MACHINES | 155.248.103.161 | DATA CENTER 1 |
| OS1MACHINES | 226.12.70.16 | DATA CENTER 2 |
| OS1MACHINES | 50.10.42.164 | DATA CENTER 2 |
| OS2MACHINES | 56.148.226.50 | DATA CENTER 1 |
| OS2MACHINES | 223.54.75.100 | DATA CENTER 3 |

USING A ROUTE SERVER TO DISTRIBUTE GROUP ADDRESS ASSOCIATIONS

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. One common characteristic of software defined networking is a separation of the control plane from the data plane. Control planes in a network are concerned with determining the logical overlay network topology and maintaining information about network entities such as logical switches, logical routers, and virtualized endpoints, etc. The logical topology information is translated by the control plane into network configuration data, such as forwarding table entries to populate forwarding tables at virtual switches at each host. A virtual switch provided by a host may be thought of as a physical network switch implemented in software by the hypervisor, and may connect virtualized endpoints running on the same host to each other as well as to virtual endpoints on other hosts. A plurality of virtual switches distributed across a plurality of hosts may collectively, by way of their forwarding tables and with adjunct processes called tunnel endpoints (TEPs) implement a logical switch that can define a logical overlay network.

A management plane in a network generally comprises one or more computing devices responsible for receiving logical network configuration inputs, such as from a user, defining one or more endpoints (e.g., VMs and/or containers) and the connections between the endpoints, as well as rules governing communications between various endpoints. In certain cases, a management plane receives definitions of groups and rules that apply to the groups. A group definition may, for instance, specify that all endpoints with a certain characteristic, such as endpoints that run a particular operating system, fall within a given group. A rule may then specify, for instance, that a first group cannot communicate with a second group. Group definitions are generally provided by the management plane to the control plane, which determines which endpoints fall within the group definitions and corresponding firewall rules are generated by the control plane and applied by the hypervisors against communication to or from those endpoints. The hypervisors generally receive the firewall rules from the control plane and enforce the rules based on which endpoints fall within the group definitions.

Sometimes an SDN comprises multiple data centers, each of which has its own control plane and hosts. In certain cases, a group may be defined that includes endpoints from different data centers.

SUMMARY

Herein described are one or more embodiments of a method for distributing associations between group identifiers and addresses in multi-site systems. The method generally includes receiving, by a first route server associated with a first central control plane of a first data center, a definition of a first group from a management plane. The method further includes learning, by the first route server, a first association between the first group and one or more addresses based on the definition of the first group. The method further includes transmitting, by the first route server, the first association to a second route server in a second central control plane of a second data center. The method further includes receiving, by the first route server, from the second route server, a second association between the first group and one or more additional addresses. The method further includes storing, by the first route server, the first association and the second association in a table. The method further includes programming, by the first central control plane, the hypervisor based on the table.

Also described herein are embodiments of a computer system, wherein software for the computer system is programmed to execute the method described above for distributing associations between group identifiers and addresses in multi-site systems.

Also described herein are embodiments of a non-transitory computer readable medium comprising instructions to be executed in a computer system, wherein the instructions when executed in the computer system perform the method described above for distributing associations between group identifiers and addresses in multi-site systems.

BRIEF DESCRIPTION OF THE DRAWINGS

FIG. 4 illustrates an example table containing associations between groups and addresses in multi-site systems.

DETAILED DESCRIPTION

In certain embodiments, a multi-site system includes a plurality of data centers with separate central control planes (CCPs) and hosts. Hosts generally run hypervisors that serve as abstraction layers for hardware resources of the hosts and generally support logical entities or endpoints such as virtual machines (VMs) and containers. In an example, an administrator defines firewall rules for endpoints based on groups, and a single group can encompass endpoints from multiple data centers. In certain examples, a group is a namespace group (NSGroup), which generally identifies members of a namespace, such as a particular subset of endpoints, and has a global group identifier that is unique across all data centers in a multi-site system. In one example, a first group is defined as including all endpoints running a first operating system (OS) and a second group is defined as including all endpoints running a second OS. An example firewall rule specifies that endpoints in the first group cannot communicate with endpoints in the second group. In one example, the administrator specifies that the first group and second group, as well as the firewall rule, apply to a plurality of data centers.

Embodiments presented herein relate to systems and methods for learning and distributing associations between group identifiers and addresses of endpoints in multi-site systems. Techniques described herein involve the use of route servers in CCPs of data centers to learn and distribute associations between group identifiers and addresses so that policies involving groups may be enforced across multiple data centers.

Figure 1:
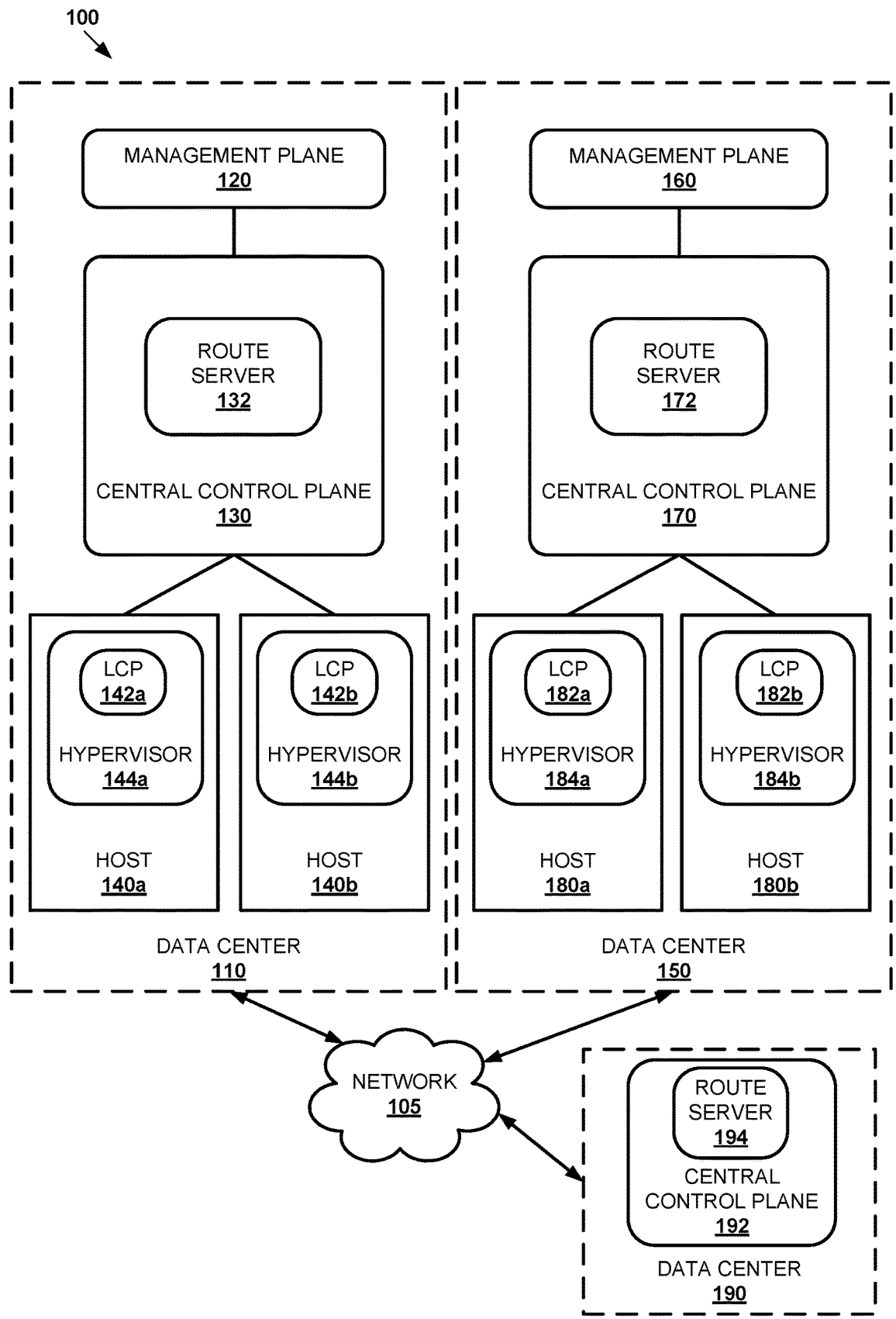
FIG. 1 illustrates a networking environment within which embodiments of the present disclosure may be implemented.

FIG. 1 illustrates a networking environment 100 within which embodiments of the present disclosure may be implemented. Networking environment 100 includes data centers 110, 150, and 190, connected via network 105. Network 105 is generally representative of a network of computing entities such as a local area network ("LAN") or a wide area network ("WAN"), a network of networks, such as the Internet, or any connection over which data may be transmitted. Data centers 110, 150, and 190 generally represent discrete sets of networked computing entities that may be geographically dispersed from each other, with separate CCPs 130, 170, and 192. Components depicted in data centers 110 and 150 are also generally representative of components of data center 190 that are not depicted, such as management planes and hosts.

As shown, data centers 110 and 150 include management planes 120 and 160, CCPs 130 and 170, and hosts 140a-b and 180a-b. It is noted that while data centers 110 and 150 are depicted with separate management planes 120 and 160, management plane functionality may alternatively or additionally be implemented in a global management plane that is common to data centers 110, 150, and 190.

In some embodiments, management planes 120 and 160 are responsible for receiving logical network configuration data, such as through an application programming interface, or users (e.g., network administrators) may enter configuration data associated with a logical network through a command-line interface or a graphical user interface associated with management planes 120 and 160. The logical network may be defined, for example, as a set of logical data paths interconnecting a set of virtual machines and/or other logical network elements (not shown) and may be referred to as a "logical overlay network" or "software defined network (SDN)." The logical networking elements may include logical switches, routers, firewalls, load balancers, etc.

Logical network elements such as logical switches and logical routers are decoupled from the underlying physical network infrastructure by way of network tunneling between hosts. Thus, any arbitrary set of endpoints, such as VMs running on hypervisors 144a and 144b, in a data center, such as data center 110, may be placed in communication across a logical Layer 2 network by connecting them to a logical switch. The logical switch is collectively implemented by virtual switches on each host that has a VM connected to the logical network. The virtual switch on each host operates as a managed edge switch implemented in software by the hypervisor on each host. Forwarding tables at the virtual switches instruct the host to encapsulate packets, using a tunnel endpoint (TEP) from a participating VM to another VM on the logical network but on a different (destination) host with an outer IP header addressed to the destination host using a mapping of VM IP addresses to host IP addresses. At the destination host, a second tunnel endpoint decapsulates the packet and then directs the packet to the destination VM. Logical routers extend the logical network across subnets or other network boundaries, such as between data centers 110, 150, and 190, using IP routing in the logical domain.

Network configuration data may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules involving groups) to be enforced at one or more logical networking elements, group definitions, etc. Each of these pieces of network configuration data, including logical networking elements, service rules, rule sets, group definitions, and the like, may be referred to as a logical entity.

Taking data center 110 as an example that is representative of data centers 110, 150, and 190, management plane 120 receives logical network configuration data and generates desired state data that specifies how the logical network should be implemented in the physical infrastructure. When users provide configuration changes (e.g., creating or deleting logical entities, modifying properties of logical entities, changing relationships between logical entities, defining firewall rules, defining groups, etc.), the changes to the desired state are distributed as logical network updates to CCP 130.

CCP 130 receives updates to the desired logical overlay network state information from management plane 120, and is responsible for converting the updates into network configuration changes that are sent as control messages (e.g., state updates) to the hypervisors 144a-b that it manages, such as via local control planes (LCPs) 142a-b. Exemplary implementations of this mechanism is described in detail in U.S. Pat. No. 9,137,107 granted Sep. 15, 2015 and U.S. Patent Application Publication 2017/0317979, which published on Nov. 11, 2017, both of which are incorporated herein by reference. In some embodiments, CCP 130 comprises a CCP cluster of controllers, with each controller in the cluster managing a different subset of hypervisors 144a-b. LCP 142a-b may each be a daemon that operates in a hypervisor 144a-b. In other embodiments, an LCP 142a-b may operate within a VM that hosts multiple containers for one or more logical networks. In some such embodiments, a first LCP 142a-b operates in a hypervisor 144a-b while a second LCP 142a-b operates in the container host VM (or multiple such controllers/virtual entities operate in multiple container host VMs).

Though shown as single units, it should be understood that both management plane 120 and CCP 130 may be implemented as distributed or clustered systems. That is, management plane 120 may include multiple computing devices that implement management plane functions, and a CCP 130 may include multiple central controller computers, virtual machines or other virtual computing instances that implement CCP functions. In some embodiments, each central controller computer(s) implements both management plane and central control plane functions (e.g., as separate applications or functions).

In certain embodiments of the present disclosure, a user defines a group that is applicable to data centers 110, 150, and 190 via management plane 120. In an example, the group definition specifies that a group with an identifier of "OS1MACHINES" is to include all endpoints that run a first OS. Management plane 120 sends the group definition to CCP 130. In certain embodiments, management plane 120 is a global management plane, and also sends the group definition to CCPs 170 and 192.

Each of CCPs 130, 170, and 190 comprises a route server 132, 172, and 194, respectively. A route server is generally a server that directs information using border gateway protocol (BGP). BGP is a standardized gateway protocol designed to exchange routing and reachability information. In an example, route servers 132, 172, and 194 are connected in a BGP mesh. In some cases, internal border gateway protocol (iBGP) is used to transport traffic within networking environment 100. A BGP mesh generally involves interconnections among a plurality of route servers for exchange of routing and reachability information. In some embodiments, in order to prevent every route server in the mesh from having to connect with every other route server in the mesh, certain route servers are designated as route reflectors. A route reflector acts as a focal point for a given subset of route servers in the mesh, collecting data from each route server in the subset and distributing the data to all of the routers in the subset. As such, for a given subset of the route reflectors in the mesh, each route server in the given subset other than the route reflector for the given subset can establish a single connection with the route reflector rather than connecting to every other route server in the given subset. In one example, route server 132 is a route reflector for route servers 132, 172, and 192. Accordingly, route servers 172 and 192 only need to connect to route server 132, and do not need to connect to each other, to receive all data shared in the mesh.

Embodiments described herein involve using route servers 132, 172, and 192 to learn associations between groups and addresses within data centers 110, 150, and 190, and share the associations with one another via BGP. As such, each of route servers 132, 172, and 194 receives the group definition from management plane 120.

Route server 132 learns associations between the group defined by the group definition and addresses of endpoints within data center 110 that fall within the group definition. In one example, CCP 130 maintains attributes of endpoints running on hypervisors 144a and 144b, and route server 132 compares the group definition to the attributes in order to determine which endpoints fall within the group definition. In another example, route server 132 sends the group definition to each of hypervisors 144a and 144b via LCPs 142a and 142b and each of hypervisors 144a and 144b then determines which endpoints, such as VMs and containers running within hypervisors 144a and 144b, fall within the group definition.

In one example, it is determined, either by route server 132 or hypervisor 144a, that two VMs running on hypervisor 144a are running the first OS, and so the two VMs fall within the group definition of "OS1MACHINES". Route server 132 may therefore determine an association between "OS1MACHINES" and IP addresses of the two VMs, or hypervisor 144a may send an association between "OS1MACHINES" and the IP addresses of the two VMs to route server 132. Route server 132 then sends the association to route servers 172 and 194. Route server 172 learns associations between "OS1MACHINES" and IP addresses of endpoints within data center 150 in a similar way, and sends the associations to route server 132. Likewise, route server 194 learns associations between "OS1MACHINES" and IP addresses of endpoints within data center 190, and sends the associations to route server 132. Because route server 132 is a route reflector, in one example, route server 132 sends the associations it receives from route server 172 to route server 194 and the associations it learns from route server 194 to route server 172. As such, each of route servers 132, 172, and 194 learns the addresses of all endpoints in networking environment 100 that fall within the group definition associated with the group identifier "OS1MACHINES". Each of route servers 132, 172, and 194 stores all of the associations in a table, such as a virtual routing and forwarding (VRF) table.

In some embodiments, route servers only send associations between a given group and endpoints to other route servers to which the given group relates. For instance, a group definition may specify which data centers the group definition applies to, and associations determined based on the group definition may only be shared among route servers in the specified data centers.

In an example, a firewall rule is defined by a user via management plane 120 stating that endpoints within "OS1MACHINES" cannot send data over the internet. The firewall rule is sent by management plane 120 to CCP 130, and in some embodiments also to CCPs 170 and 192. Each of CCPs 130, 170, and 192 then programs hypervisors within its respective data center 110, 150, or 190 to enforce the firewall rule based on the VRF table that stores associations between IP addresses and the group "OS1MACHINES".

For example, a component of CCP 130, such as a firewall management component, creates a rule on a firewall of hypervisor 144a that each of the IP addresses associated with "OS1MACHINES" in the VRF table cannot send data over the internet. As such, if one of the two VMs on hypervisor 144a in "OS1MACHINES" attempts to send data over the internet, the firewall of hypervisor 144a will block the data from being sent.

Techniques described herein may be particularly useful when firewall rules involve multiple groups. For example, if a rule states that endpoints in "OS1MACHINES" cannot communicate with endpoints in a second group "OS2MACHINES", it is important for all CCPs within networking environment 100 that relate to endpoints in the first group or the second group to know the membership of each group across all of data centers 110, 150, and 190. Using techniques described herein, if a VM in "OS1MACHINES" on hypervisor 184a of data center 150 attempts to communicate with a VM in "OS2MACHINES" on hypervisor 144a in data center 110, hypervisors 184a and 144a will both have been programmed by CCPs 170 and 130, respectively, to prohibit the communication, as both CCPs will be aware of all associations between the groups and IP addresses of endpoints in networking environment 100.

Figure 2:
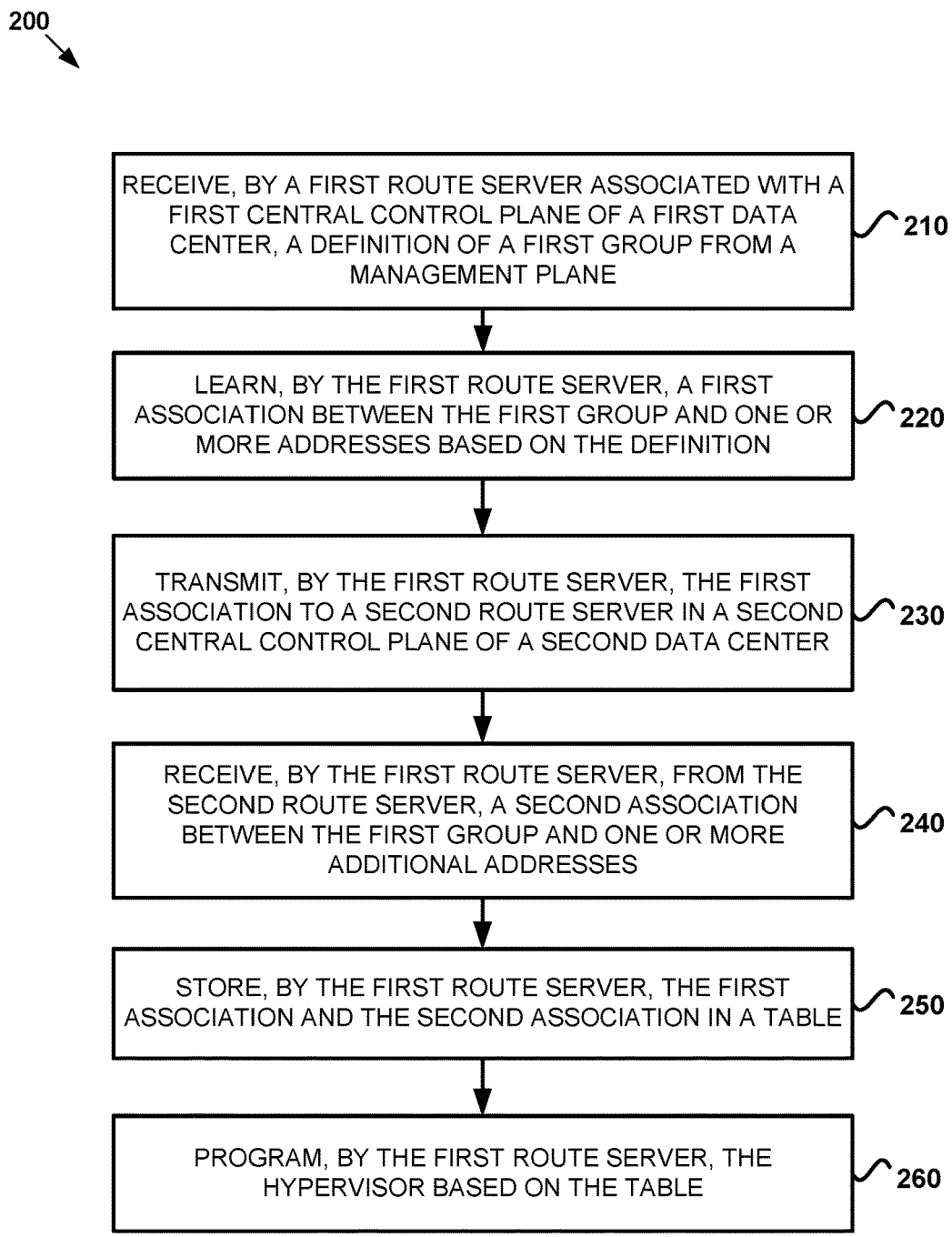
FIG. 2 illustrates example operations for learning and distributing associations between groups and addresses in multi-site systems.

FIG. 2 illustrates example operations 200 for learning and distributing associations between groups and addresses in multi-site systems. In some embodiments, operations 200 are performed by route server 132 of FIG. 1.

Operations 200 begin at step 210, where a first route server associated with a first central control plane (CCP) of a first data center receives a definition of a first group from a management plane. In some embodiments, route server 132 of FIG. 1 receives the definition of the first group from management plane 120 of FIG. 1. In one example, the definition defines the first group as including all endpoints within data centers 110, 150, and 190 of FIG. 1 that run a first application, such as a given OS. In other embodiments, the definition defines the first group as including specific endpoints. In some embodiments, a policy such as a firewall involving the first group is also received by CCP 130 of FIG. 1 from management plane 120 of FIG. 1.

At step 220, the first route server learns a first association between the first group and one or more addresses based on the definition of the first group. In some embodiments, route server 132 of FIG. 1 compares the definition of the first group to attributes of endpoints running on hypervisors associated with CCP 130 of FIG. 1 to determine which endpoints fall within the definition. For example CCP 130 may maintain attributes of all endpoints running on hypervisors 144a and 144b of FIG. 1. In other embodiments, CCP 130 provides the definition to each of hypervisors 144a and 144b of FIG. 1, such as via LCPs 142a and 142b of FIG. 1, and receives the first association from hypervisor 144a of FIG. 1, such as from LCP 142a of FIG. 1. In an example, route server 130 or hypervisors 144a and 144b of FIG. 1 determines the first association based on information about endpoints running on hypervisors 144*a* and 144*b* of FIG. 1, such as by determining which endpoints meet one or more characteristics defined in the definition. In an example, a set of endpoints running a given OS are identified as belonging to the first group, and route server 132 of FIG. 1 learns an association between IP addresses of the set of endpoints and the group, which may be identified by a group identifier.

At step 230, the first route server transmits the first association to a second route server in a second CCP of a second data center. In some embodiments, route server 132 of FIG. 1 transmits the first association to route server 172 in CCP 170 of data center 150 of FIG. 1, such as via BGP. In an example, route server 132 of FIG. 1 is a route reflector in a BGP mesh.

At step 240, the first route server receives a second association between the first group and one or more additional addresses. In some embodiments, route server 132 of FIG. 1 receives the second association from route server 172 of FIG. 1. In an example, route server 172 of FIG. 1 determines the second association by learning which endpoints running on hypervisors 184*a* and/or 184*b* in data center 150 of FIG. 1 meet one or more conditions specified in the definition of the first group, such as running a given OS.

At step 250, the first route server stores the first association and the second association in a table. In some embodiments, route server 132 of FIG. 1 stores the first association and the second association in a VRF table. A VRF table storing associations is described in more detail below with respect to FIG. 4. It is noted that, in some embodiments, route server 132 of FIG. 1 also stores an indication of which data center each association was received from in the table.

In certain embodiments, the first route server sends the first association and the second association to one or more additional data centers. In an example, route server 132 of FIG. 1 sends the first association and the second association to data center 190 of FIG. 1 and, in some cases, received a third association from data center 190 of FIG. 1. For example, if route server 132 of FIG. 1 is a route reflector for route servers 132, 172, and 194, then route server 132 of FIG. 1 receives associations from and distributes the associations to all of the route servers for which it is the route reflector. In other embodiments, route servers 132, 172, and 194 of FIG. 1 are all interconnected in a BGP mesh, and send the associations among each other.

At step 260, the first CCP programs the hypervisor based on the table. In some embodiments, CCP 130 of FIG. 1 sets one or more firewall rules on hypervisors 144*a* and 144*b* based on the table determined by route server 132. For instance, if CCP 130 of FIG. 1 receives a policy specifying a firewall rule involving the first group from management plane 120 of FIG. 1, CCP 130 of FIG. 1 creates a firewall rule corresponding to the policy and the associations in the table on hypervisors 144*a* and 144*b* of FIG. 1. In an example, a policy states that the first group cannot communicate over the internet. As such, CCP 130 of FIG. 1 creates firewall rules on hypervisors 144*a* and 144*b* of FIG. 1 specifying that each address corresponding to the first group in the table cannot communicate over the internet.

Figure 3:
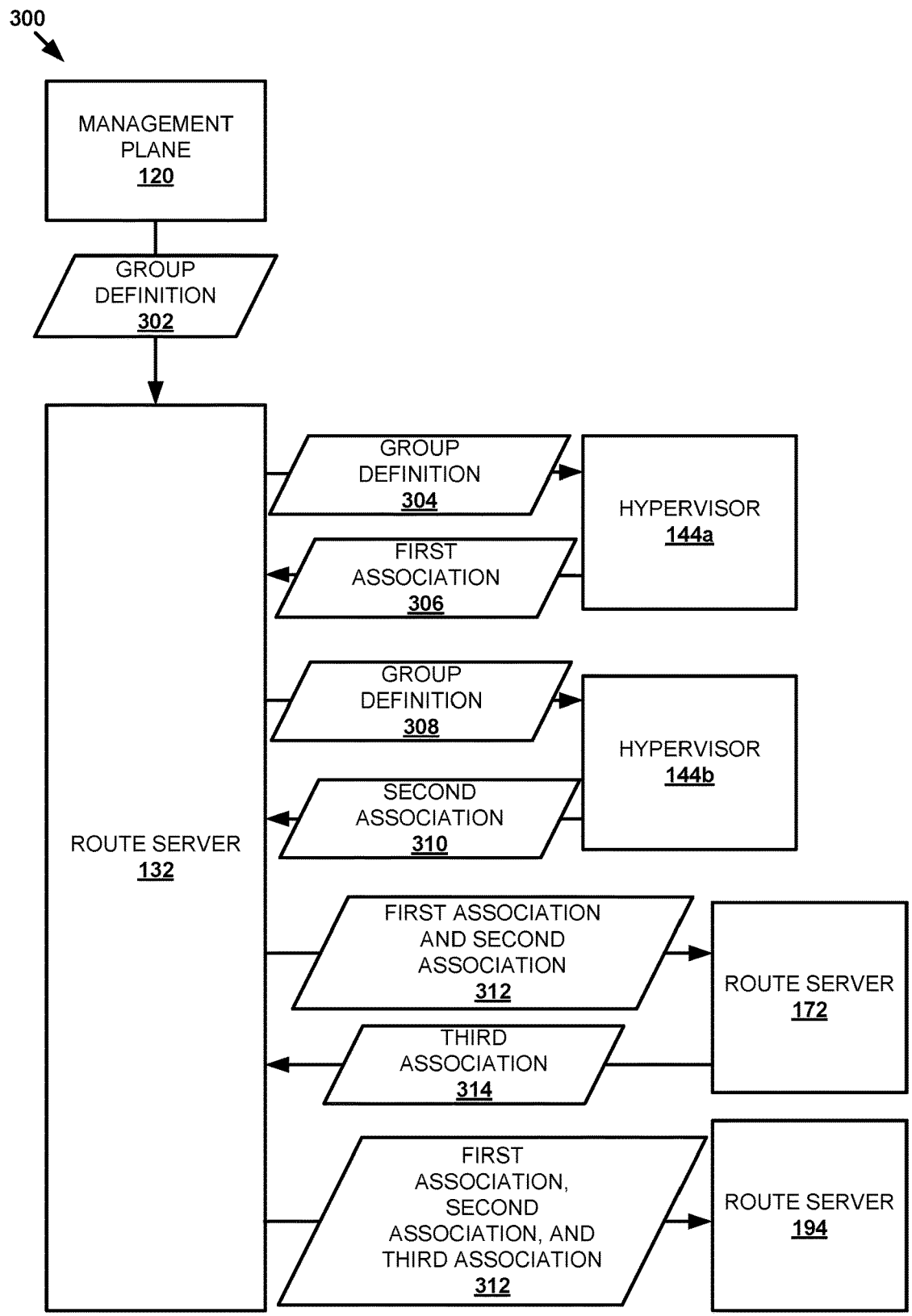
FIG. 3 illustrates an example of learning and distributing associations between groups and addresses in multi-site systems.

FIG. 3 illustrates an example 300 of learning and distributing associations between groups and addresses in multi-site systems. As shown, example 300 includes management plane 120, route servers 132, 172, and 194, and hypervisors 144*a* and 144*b* of FIG. 1.

At 302, management plane 120 sends a group definition to route server 132. The group definition generally represents a definition of a group, such as one or more conditions for membership in the group, along with a group identifier.

At 304 and 308, route server 132 sends the group definition to hypervisors 144*a* and 144*b*. At 306, hypervisor 144*a* sends a first association to route server 132, and at 310, hypervisor 144*b* sends a second association to route server 132. The first association and the second association generally comprise associations between addresses and the group. In other embodiments, route server 132 learns first association 306 and second association 310 based on group definition 302 and information stored by CCP 130 of FIG. 1 without querying hypervisors 144*a* and 144*b*.

At 312, route server 132 sends the first association and the second association to route server 172. In an example, route server 132 is a route reflector for route servers 132, 172, and 194. As such, at 314, route server 172 sends a third association to route server 132. The third association generally comprises an association between one or more addresses and the group.

At 312, route server 132 sends the first association, the second association, and the third association to route server 194.

Following the exchange of information shown in example 300, in certain embodiments, each of route servers 132, 172, and 194 stores the first association, the second association, and the third association in a table, such as a VRF table, as described in more detail below with respect to FIG. 4

FIG. 4 illustrates an example table 400 containing associations between groups and addresses in multi-site systems. In one example, table 400 is a VRF table generated by route server 132, 172, and/or 194 of FIG. 1 as described above with respect to FIGS. 1-3.

Table 400 includes mappings of group identifiers to IP addresses and domains. For example, the group identifier "OS1MACHINES" is mapped in table 400 to the IP address "155.248.103.161" and the domain "DATA CENTER 1", indicating that the IP address "155.248.103.161" is in "DATA CENTER 1", which may correspond to data center 110 of FIG. 1, and falls within a definition of the group "OS1MACHINES". In an example, the group "OS1MACHINES" is defined as all endpoints that run a first OS, and the group "OS2MACHINES" is defined as all endpoints that run a second OS.

Table 400 indicates that the group "OS1MACHINES" contains the endpoints associated with the IP addresses "155.248.103.161" in "DATA CENTER 1", "226.12.70.16" and "50.10.42.164" in "DATA CENTER 2". Likewise, table 400 indicates that the group "OS2MACHINES" contains the endpoints associated with the IP addresses "56.148.226.50" in "DATA CENTER 1" and "223.54.75.100" in "DATA CENTER 3".

Embodiments described herein (e.g., with respect to FIGS. 1-4) constitute an improvement with respect to conventional industry practices, as they allow for associations between groups and addresses to be distributed across multiple data centers in a multi-site system, thereby allowing for more effective enforcement across data centers of policies, such as firewall rules, involving groups. Utilizing route servers associated with CCPs of data centers to learn and distribute associations between groups and addresses allow for the use of efficient BGP and/or route reflector techniques for distribution of the associations.

It is noted that BGP is only included as one example with which techniques described herein may be employed. Alternative embodiments may involve the use of other protocols and techniques for distributing associations.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for learning and distributing associations between groups and addresses in a multi-site system, comprising:

receiving, by a first route server associated with a first central control plane of a first data center, a definition of a first group from a management plane, wherein the first group comprises a particular subset of endpoints in the multi-site system and has a global group identifier that is unique across all data centers in the multi-site system;

learning, by the first route server, a first association between the first group and one or more addresses based on the definition of the first group;

transmitting, by the first route server, the first association to a second route server in a second central control plane of a second data center;

receiving, by the first route server, from the second route server, a second association between the first group and one or more additional addresses;

storing, by the first route server, the first association and the second association in a table; and programming, by the first central control plane, a hypervisor on a host in the first data center based on the table.

2. The method of claim 1, further comprising receiving, by the first central control plane, from the management plane, a policy relating to the first group, wherein programming, by the first central control plane, the hypervisor is further based on the policy.

3. The method of claim 1, wherein storing by the first route server, the first association and the second association in the table further comprises;

storing an identifier of the first data center in relation to the first association in the table; and storing an identifier of the second data center in relation to the second association in the table.

4. The method of claim 1, further comprising transmitting, by the first route server, the first association and the second association to a third route server in a third central control plane of a third data center.

5. The method of claim 1, wherein the one or more addresses comprise one or more internet protocol (IP) addresses of endpoints in the first data center that correspond to the definition of the first group.

6. The method of claim 1, wherein transmitting, by the first route server, the first association to the second route server comprises a border gateway protocol (BGP) transmission.

7. The method of claim 6, wherein the first route server is a route reflector for a set of route servers comprising the first route server and the second route server.

8. A computer system comprising: one or more processors; and a non-transitory computer-readable medium storing instructions that, when executed, cause the one or more processors to perform a method for learning and distributing associations between groups and addresses in a multi-site system, the method comprising:

receiving, by a first route server associated with a first central control plane of a first data center, a definition of a first group from a management plane, wherein the first group comprises a particular subset of endpoints in the multi-site system and has a global group identifier that is unique across all data centers in the multi-site system;

learning, by the first route server, a first association between the first group and one or more addresses based on the definition of the first group;

transmitting, by the first route server, the first association to a second route server in a second central control plane of a second data center;

receiving, by the first route server, from the second route server, a second association between the first group and one or more additional addresses;

storing, by the first route server, the first association and the second association in a table; and programming, by the first central control plane, a hypervisor on a host in the first data center based on the table.

9. The computer system of claim 8, wherein the method further comprises receiving, by the first central control plane, from the management plane, a policy relating to the first group, wherein programming, by the first central control plane, the hypervisor is further based on the policy.

10. The computer system of claim 8, wherein storing by the first route server, the first association and the second association in the table further comprises;

storing an identifier of the first data center in relation to the first association in the table; and storing an identifier of the second data center in relation to the second association in the table.

11. The computer system of claim 8, wherein the method further comprises transmitting, by the first route server, the first association and the second association to a third route server in a third central control plane of a third data center.

12. The computer system of claim 8, wherein the one or more addresses comprise one or more internet protocol (IP) addresses of endpoints in the first data center that correspond to the definition of the first group.

13. The computer system of claim 8, wherein transmitting, by the first route server, the first association to the second route server comprises a border gateway protocol (BGP) transmission.

14. The computer system of claim 13, wherein the first route server is a route reflector for a set of route servers comprising the first route server and the second route server.

15. A non-transitory computer readable medium comprising instructions that, when executed by one or more processors of a computing system, cause the computing system to perform a method for learning and distributing associations between groups and addresses in a multi-site system, the method comprising:

receiving, by a first route server associated with a first central control plane of a first data center, a definition of a first group from a management plane, wherein the first group comprises a particular subset of endpoints in the multi-site system and has a global group identifier that is unique across all data centers in the multi-site system;

learning, by the first route server, a first association between the first group and one or more addresses based on the definition of the first group;

transmitting, by the first route server, the first association to a second route server in a second central control plane of a second data center;

receiving, by the first route server, from the second route server, a second association between the first group and one or more additional addresses;

storing, by the first route server, the first association and the second association in a table; and programming, by the first central control plane, a hypervisor on a host in the first data center based on the table.

16. The non-transitory computer readable medium of claim 15, wherein the method further comprises receiving, by the first central control plane, from the management plane, a policy relating to the first group, wherein programming, by the first central control plane, the hypervisor is further based on the policy.

17. The non-transitory computer readable medium of claim 15, wherein storing by the first route server, the first association and the second association in the table further comprises;

storing an identifier of the first data center in relation to the first association in the table; and storing an identifier of the second data center in relation to the second association in the table.

18. The non-transitory computer readable medium of claim 15, wherein the method further comprises transmitting, by the first route server, the first association and the second association to a third route server in a third central control plane of a third data center.

19. The non-transitory computer readable medium of claim 15, wherein the one or more addresses comprise one or more internet protocol (IP) addresses of endpoints in the first data center that correspond to the definition of the first group.

20. The non-transitory computer readable medium of claim 15, wherein transmitting, by the first route server, the first association to the second route server comprises a border gateway protocol (BGP) transmission.

* * * * *